(12) United States Patent
Kim et al.

(10) Patent No.: US 6,390,116 B1
(45) Date of Patent: May 21, 2002

(54) LARGE AMPLITUDE PNEUMATIC OSCILLATOR

(75) Inventors: Byung-Hun Kim; David R. Williams, both of Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 09/906,423

(22) Filed: Jul. 16, 2001

(51) Int. Cl.$^7$ .................................................. G05D 7/06
(52) U.S. Cl. ................ 137/14; 137/624.15; 137/624.13
(58) Field of Search ............................. 137/624.15, 14, 137/624.13

(56) References Cited

U.S. PATENT DOCUMENTS

| | | |
|---|---|---|
| 3,568,702 A | 3/1971 | Dustin |
| 3,710,815 A | 1/1973 | Morris et al. |
| 3,724,485 A | 4/1973 | Cox et al. |
| 3,786,788 A | 1/1974 | Suda et al. |
| 3,829,058 A | 8/1974 | Andersen |
| 4,267,856 A | 5/1981 | Kwok et al. |
| 4,343,280 A | 8/1982 | Luscomb |
| 4,459,819 A | 7/1984 | Hargraves |
| 4,674,462 A | 6/1987 | Koch et al. |
| 4,754,748 A * | 7/1988 | Antowski ..................... 128/40 |
| 4,758,142 A * | 7/1988 | Voss et al. ..................... 425/7 |
| 5,141,847 A * | 8/1992 | Sugimachi et al. . 137/624.15 X |
| 5,402,652 A | 4/1995 | Alsenz |
| 5,579,806 A | 12/1996 | Bewsky |
| 5,615,832 A | 4/1997 | Price |
| 5,628,293 A | 5/1997 | Gibson et al. |
| 5,983,863 A | 11/1999 | Cavanagh et al. |
| 6,073,862 A | 6/2000 | Touchette et al. |

* cited by examiner

Primary Examiner—Kevin Lee
(74) Attorney, Agent, or Firm—Pauley Petersen Kinne & Erickson

(57) ABSTRACT

A system for producing variable amplitude pneumatic pulses, such as may be used to prevent flow separation on airfoil and diffuser surfaces to control stalling, utilizes a source of pressurized air which is regulated and fed to parallel outlet lines. Each outlet line has a control valve therein attached to a controller for activation of the valves. The first parallel line leads to an actuator which supplies the pulsed air to a desired surface. The second parallel line leads to the atmosphere. By cycling the valves at about ninety degrees out of phase, pneumatic pulses of large amplitude are obtained with a simple device capable of being transported on the aircraft.

20 Claims, 2 Drawing Sheets

LARGE AMPLITUDE PNEUMATIC OSCILLATOR

BACKGROUND OF THE INVENTION

1. Field of the Invention

The present invention relates generally to fluid flow control. The present invention relates specifically to a practical pneumatic oscillator for generating large amplitude pressure and velocity oscillations suitable to prevent stalling on airfoil and diffuser surfaces.

2. Discussion of the Related Art

Active air flow control is an area of intense research in the aerospace industry. In particular, air flow control using pulsed air injection through slots and holes on various surfaces of the aircraft and aircraft engines is known to improve performance when operating near stalled conditions. Air flow control with pulsed air injection has been demonstrated under laboratory conditions to control forebody flow vortices on aircraft and missiles at high angles of attack, delay the stall of wings on aircraft, enhance the lift characteristics of helicopter blades, suppress the stall in engine compressor inlets, and enhance the performance of vanes in axial flow compressors.

The aerospace industry is attempting to transition laboratory results of flow control experiments into prototype applications. The principal difficulty in most cases has been to produce large amplitude velocity oscillations at the air-to-surface interface with equipment that is practical to be carried in the aircraft. In the laboratory one typically uses large loudspeakers and acoustic drivers with massive power amplifiers, or a large rotating valve with a drive mechanism to produce the pressure oscillations. One problem with the speaker approach is that the equipment needed is too large. Secondly, the speaker techniques are limited by the push-pull nature of the loud speaker diaphragms to low frequency bandwidths which produce only small amplitude oscillations superposed on a steady jet of air. Similarly, known techniques utilizing a single valve in a single pressurized line produce only small amplitude oscillations superposed on a steady jet of air. When the frequency of the single valve opening goes up, the amplitude of the pressure changes goes down. What is needed is a device that is sufficiently compact and simple enough to be practical for implementation on aircraft while producing pressure oscillations near the maximum possible amplitude.

SUMMARY OF THE INVENTION

The present invention solves the above problems by providing both a device and a process for using the device. In broad outline, the device comprises a pair of activatable valves connected in first and second parallel lines downstream from a pressurized air supply. "Parallel" will be understood to mean that the lines are interconnected and could share a parallel flow, and not that the lines must be physically parallel. The downstream side of the first valve is connected via a suitable air conduit, or actuator line, to an actuator outlet which provides pulsed air, to the controlled surface. The controlled surface may be, e.g., an airfoil surface or a diffuser surface such as a vane or compressor as may be found on turbine engines. This conduit between the first valve and the actuator may be referred to as the actuator line. The actuator line typically leads to the controlled surface through a thin slot, sometimes herein called the actuator outlet, of smaller dimensions than the actuator line. Thus, by way of explanation and not limitation, it is believed that as pressure rises in the actuator line, air velocity will increase through the actuator outlet at the controlled surface. The downstream side of the second valve can be either open to the atmosphere or connected to a vacuum line or other source, or area, of lower pressure. A controller is used to set the activation and frequency of oscillation of the two valves and the phase difference between the two valves. In some embodiments the duty cycles of the valves may also be controlled.

Pressurized air is suitably provided by an onboard source such as may be commonly found in the compressor stages of jet engines or otherwise provided, such as by a dedicated onboard compressor. The supply line for the pressurized air is then preferably fed to a pressure regulator to supply an output stream of known pressure. The regulator may provide a fixed value pressure or may be adjustable, such as through control signal input from the controller function. The proper operation of the device then produces the needed amplitude of pneumatic oscillations at the actuator.

The process, or operational, component of the invention uses offset timing of the second valve, from activation of the first valve, to create an air-ejector effect through the second line thereby decreasing pressure in the actuator line. Typically the opening and closing of the second valve will lag the opening and closing of the first valve by about a quarter cycle, or about ninety degrees. The large amplitude oscillations occur because the second valve acts like an air ejector when it is open, which lowers the pressures in each parallel line, and concurrently increases velocity through the second line by the Bernoulli principle, and particularly for purposes of the present invention, lowers the pressure in the first parallel line. The combined high and low pressure phases of the two line system, due to the offset opening and closing of the valves, produce pressure oscillations in the first, or actuator line, of an amplitude and frequency sufficient for creating air velocity pulses at the actuator outlet to control air flow at the airfoil or diffuser surfaces.

DETAILED DESCRIPTION OF THE PREFERRED EMBODIMENT

Figure 1:
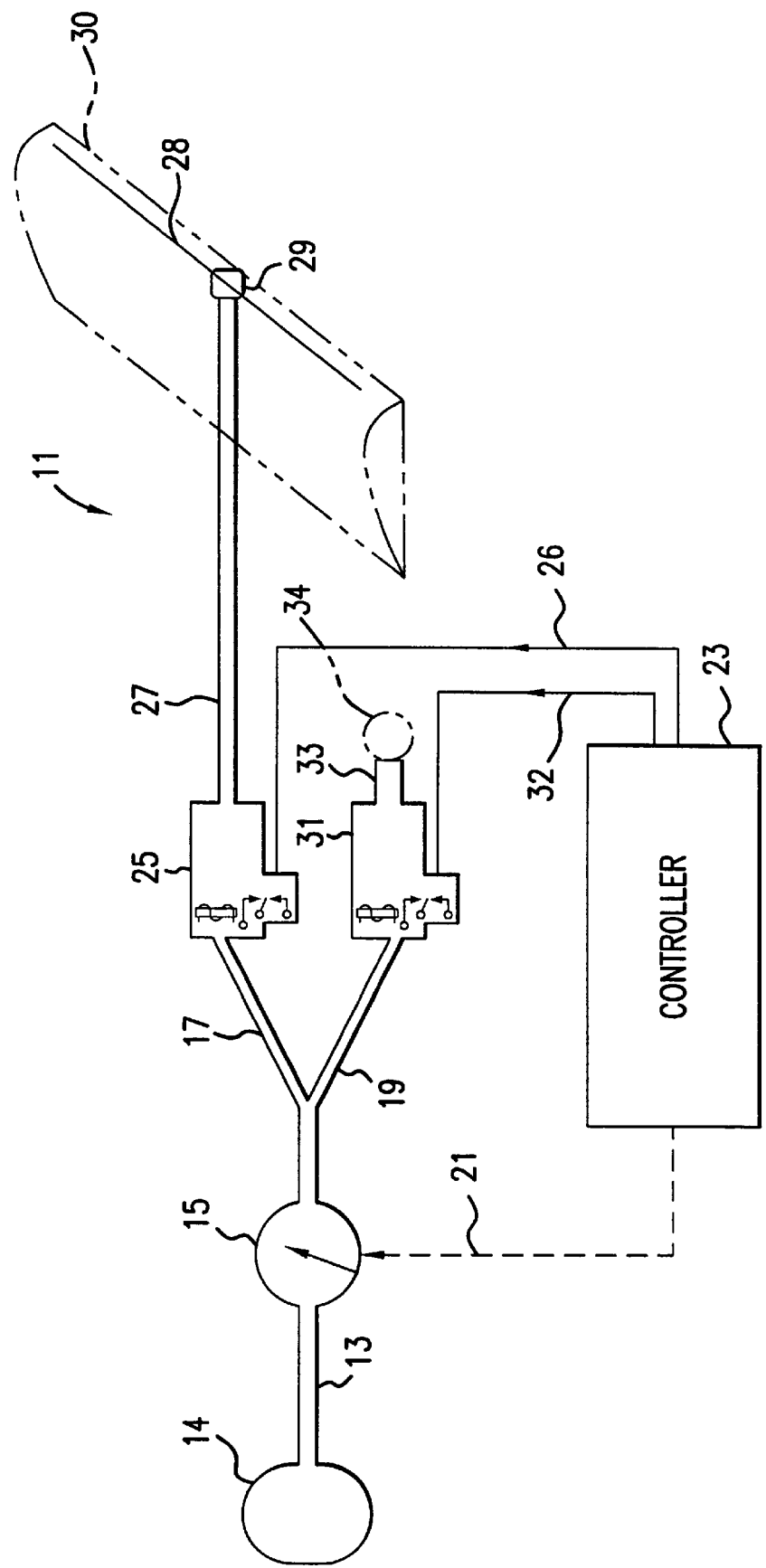
FIG. 1 is a schematic representation of a device according to one embodiment of the present invention.

As seen in FIG. 1, a pneumatic oscillator 11 according to the present invention comprises an air supply line 13 which is connected to a source of pressurized air 14 such as an engine compressor typically found in a jet aircraft engine or a dedicated compressor. The air supply line 13 leads to a pressure regulator 15 for control of the air flow to primary and secondary air lines 17, 19, respectively, which are parallel and downstream from the pressure regulator 15. The pressure regulator 15 may be variably controlled for selectable pressure as indicated by the dashed signal line 21 leading from an electronic controller 23. Alternatively, the pressure regulator may be set to a fixed regulation point and not connected to the controller 23.

Connected across the primary air line 17 is a first valve 25 for controlling, e.g., opening and closing, air flow through the actuator line section 27 of the primary air line 17 downstream from the first valve 25. The first valve 25 may be an electrically activated solenoid although other suitable valves or means of activation may be utilized according to the known skill in the art without deviating from the present invention. The electronic controller 23 is shown as electrically connected by a signal line 26 for activation of the first valve 25. The construction and arrangement of a suitable controller are considered to be within the skill of the art and are left to the individual designer for implementation. Other suitable sensing and control apparatus for monitoring and adjusting system performance, e.g., to add efficiency, safety, or redundancy to the system, may of course be added to various control points or subsystems of the present invention.

The actuator line section 27 of the primary air line 17 supplies an actuator 29 which is the operative end of the pneumatic oscillator 11 and may, for example, have an outlet which is a thin slot 28, or tube with a series of holes, leading to the surface of an aircraft wing 30 (in phantom) or rotor needing pulsed air to improve its flight characteristics.

Connected across the secondary air line 19 is a second valve 31, preferably of the identical type as the first valve 25, for controlling, e.g., opening and closing, air flow through the secondary air line 19. The second valve 31 is shown as connected to the electronic controller 23 through a signal line 32 for activation thereof in conjunction with the first valve 25, as further explained below.

A low pressure section 33 of the secondary air line 19 is located downstream from the second valve 31 and is open to the atmosphere for simplicity of construction in the preferred embodiment. Alternatively, the low pressure section 33 of the secondary line 19 may open to a vacuum line 34 (in phantom) as may be provided on an aircraft. "Vacuum" as used herein will mean any area of negative pressure. Other areas having a pressure lower than that of the actuator line section 27 may also be used within the meaning of the present invention depending on the oscillation performance demanded of the system.

Figure 2:
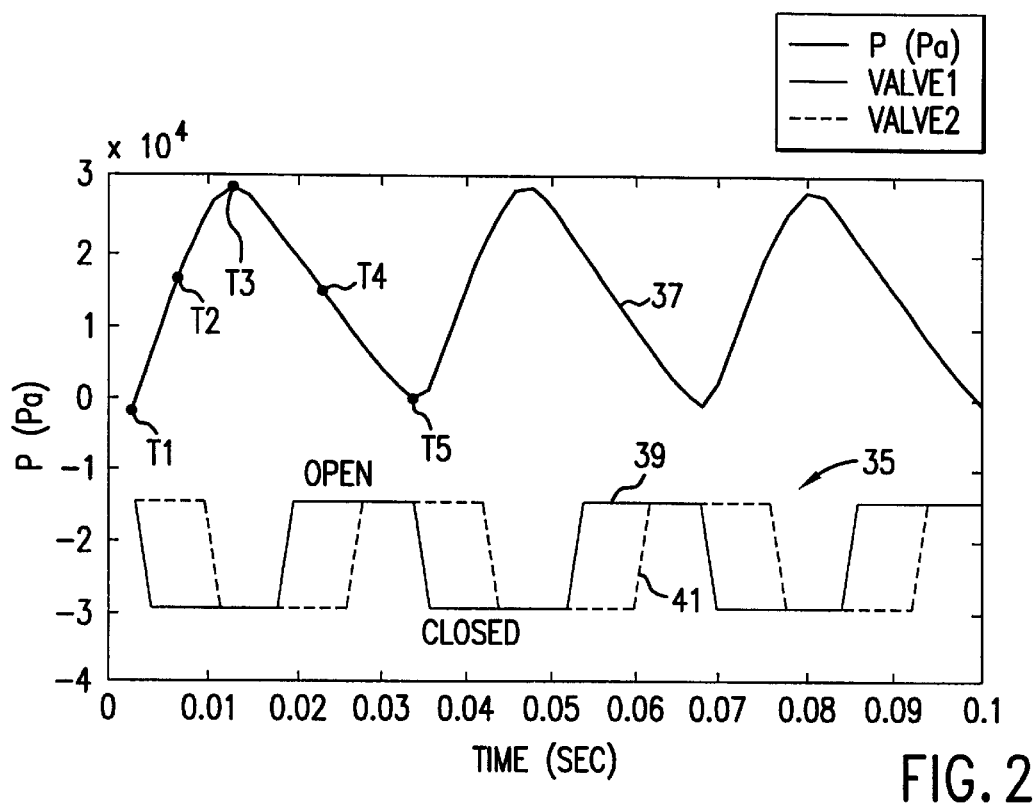
FIG. 2 is a graph of a pressure wave of the present invention superposed over the operating cycles of the first valve and the second valve.

Referencing FIGS. 1 and 2, FIG. 2 shows the opening and closing duty cycles 35 of the first and second valves 25, 31 superposed for a comparison with a graph of the pressure wave 37 in the actuator line section 27, with the X axis being a time line of 0.1 seconds, and the Y axis being pressure in pascals at ten to the fourth power. The solid line 39 shows the first valve cycle and the dotted line 41 shows the second valve cycle. The phase difference between the first valve and the second valve may be optimized to give the largest pressure amplitude in the actuator line section 27. The second valve, which controls the low pressure phase of the cycle, is delayed by approximately 90 degrees relative to the first valve. The valves are oscillating at about 30 hertz and have about a 50 percent duty cycle.

At time T1 on the pressure wave graph both the first valve and the second valve are fully open, representing the lowest pressure on the pressure wave 37. It will be noted that the pressure drops briefly below zero pascals gauge pressure indicating that, when the second valve opens the secondary line 19 fully to the atmosphere, air is actually being withdrawn from the primary line 17 for a brief interval.

At time T2, the first valve is closed and the second valve is open, raising the pressure on the pressure wave 37, i.e., in the actuator line section 27. At time T3, both the first valve and the second valve are closed, representing the highest pressure at the actuator 29. At time T4, the first valve is open and the second valve remains closed, decreasing air pressure at the actuator. At time T5, both valves have opened again, bringing the pressure to its lowest point.

Figure 3:
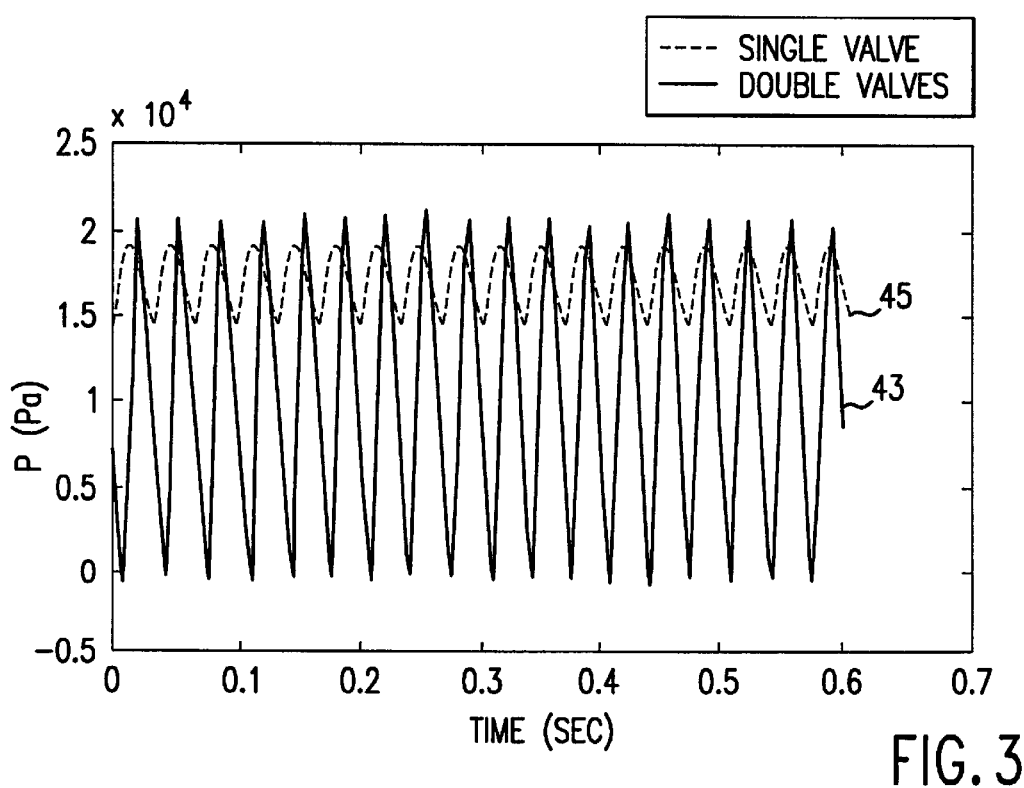
FIG. 3 is a graph comparing pulse performance of an embodiment of the present invention and a system utilizing a single valve.

FIG. 3 compares the performance of an embodiment of the present invention to a single-valve arrangement, as further explained below. A graph 43 of the line pressure in the actuator line 27 downstream of the first valve 25 is shown when the valves are oscillating at 30 Hz. The pressure graph 45 of the single-valve configuration, also oscillating at 30 Hz, is shown as the dotted line. The peak-to-peak pressure amplitude of the present invention, at about −1 to about +21 kilopascals, is between four and five times larger than the single-valve system which ranges from about 14 to about 19 kilopascals.

Double Valve Experimental Details

Air was supplied from a shop air supply 14 at 100 psig to an Ingersoll Rand pressure regulator 15. The valves 25, 31 were connected between the regulator 15 and an airfoil model 30 with 0.5 inch inner diameter rubber tubing. The airfoil model 30 had an actuator outlet slot of one-eighth inch wide by twelve inches long. The pressure regulator 15 reduced the pressure to the solenoid valves 25, 31 and controlled the overall flow rate through the system 11 to 13.6 cfm. Valve 31 opened to the atmosphere. Measurements of the fluctuating pressure were made with a Kulite pressure transducer, model no. xcs-093-5g, from Kulite Semiconductor Products, Inc. of Leonia, N.J. The Kulite transducer was located at the actuator 29. A Setra model no. 239 pressure transducer, from Setra System, Inc. of Boxborough, Mass., was used to measure the pressure in the tubing downstream of the regulator 15. The valves 25, 31 used were 24 VAC solenoid valves manufactured by WaterMaster from Orbit Irrigation Products, Inc. of Bountiful, Utah. The valves were opened and closed by computer control using LABVIEW™ software from National Instruments of Austin, Tex. The time delays between valve openings and duty cycles were adjusted with the LABVIEW™ software. The data signals from the pressure transducers and the signals to the solenoid valves were also acquired with the LABVIEW™ program. The data shown in FIG. 2 were acquired at a total flow rate of 13.6 cfm.

Single Valve Experimental Details

The single valve experiments were identical to the double-valve experiment except the valve 31 opening to atmosphere was completely closed.

Having thus disclosed a system including apparatus and method of operation for a pneumatic pressure oscillator having two parallel valve-operated lines for imposing large amplitude pressure oscillations on a stream of pressurized air, such as may be suitably employed for active air flow control on airfoil and diffuser surfaces, it will be appreciated that many aspects of the present apparatus and method may be adjusted to alter the performance characteristics of the system of the present invention without deviating from the spirit of the invention. The present invention is intended to be limited only by the appended claims.

We claim:

1. Apparatus for producing pneumatic pulses from a stream of pressurized air, comprising:

a) an air supply line for supplying pressurized air;

b) a primary air line downstream of the air supply line for receiving the pressurized air;

c) a secondary air line downstream of the air supply line for receiving the pressurized air;

d) the primary air line and secondary air line being in parallel;

e) the primary air line and secondary air line having a respective first and second valve therein;

f) a controller for controlling activation of the respective first and second valves in and out of phase relation;

g) the primary air line opening to an actuator outlet for outputting the pneumatic pulses; and h) the secondary air line opening to an area having pressure lower than that of the pressurized air.

2. The apparatus for producing pneumatic pulses of claim 1 further including a pressure regulator located between the air supply line and the primary and secondary air lines.

3. The apparatus for producing pneumatic pulses of claim 2 wherein the pressure regulator provides means for variably selecting air pressure of the pressurized air.

4. The apparatus for producing pneumatic pulses of claim 1 wherein the first and second valves are solenoids.

5. The apparatus for producing pneumatic pulses of claim 1 wherein the first and second valves are electrically activated.

6. The apparatus for producing pneumatic pulses of claim 1 wherein the controller provides means for variably controlling activation frequencies of the first and second valves.

7. The apparatus for producing pneumatic pulses of claim 1 wherein the controller provides means for variably controlling activation phase differences of the first and second valves.

8. The apparatus for producing pneumatic pulses of claim 1 wherein the controller provides means for variably controlling activation duty cycles of the first and second valves.

9. The apparatus for producing pneumatic pulses of claim 1 wherein the area having pressure lower than that of the pressurized air is the atmosphere.

10. The apparatus for producing pneumatic pulses of claim 1 wherein the area having pressure lower than that of the pressurized air is a vacuum.

11. Apparatus for producing velocity, frequency and amplitude variable pneumatic pulses from a stream of pressurized air, comprising:

a) an air supply line for supplying pressurized air;

b) a pressure regulator for receiving and regulating the pressurized air to a desired pressure to produce regulated air;

c) a primary air line downstream of the pressure regulator for receiving the regulated air from the pressure regulator;

d) a secondary air line downstream of the pressure regulator for receiving the regulated air from the pressure regulator;

e) the primary air line and the secondary air line being in parallel;

f) the primary air line and the secondary air line having a respective first and second activatable valve therein;

g) a frequency controller and a phase controller for controlling the activation of the respective first and second activatable valves including frequency of oscillation, and phase difference between the valves;

h) the primary air line opening to an actuator outlet for outputting the pneumatic pulses; and i) the secondary air line opening to an atmosphere or vacuum.

12. Apparatus for producing velocity, frequency and amplitude variable pneumatic pulses from a stream of pressurized air according to claim 11 wherein the first activatable valve is a solenoid valve.

13. Apparatus for producing velocity, frequency and amplitude variable pneumatic pulses from a stream of pressurized air according to claim 11 wherein the second activatable valve is a solenoid valve.

14. Apparatus for producing velocity, frequency and amplitude variable pneumatic pulses from a stream of pressurized air according to claim 11 wherein the desired pressure is selectable.

15. Apparatus for producing velocity, frequency and amplitude variable pneumatic pulses from a stream of pressurized air according to claim 11 further comprising a source of pressurized air.

16. A method for producing pneumatic pulses from a stream of pressurized air, comprising:

a) supplying the pressurized air to an air supply line;

b) receiving the pressurized air in a primary air line downstream of the air supply line;

c) receiving the pressurized air in a secondary air line downstream of the air supply line in parallel with the primary air line;

d) controlling the flow of air in the primary and secondary air lines by activatable valves in each line, including controlling frequency of actuation of the valves to produce pneumatic pulses;

e) outputting the pneumatic pulses from the primary air line to a surface requiring pulsed pneumatic flow; and f) outputting the pneumatic pulses from the secondary air line to an area having pressure lower than that of the pressurized air.

17. The method of claim 16 further including the step of controlling phase difference of activation between the activatable valves of the primary and secondary air lines.

18. The method of claim 17 further including the step of operating the activatable valves of the primary and secondary air lines out of phase by about 90 degrees.

19. The method of claim 16 further including outputting the pneumatic pulses from the primary air line to an airfoil or diffuser surface.

20. The method of claim 16 further including the step of operating the activatable valves of the primary and secondary air lines at duty cycles of about 50 percent.

* * * * *